(No Model.)
W. J. GODDEN.
DEVICE FOR TRAINING HORSES' MANES.
No. 549,781. Patented Nov. 12, 1895.
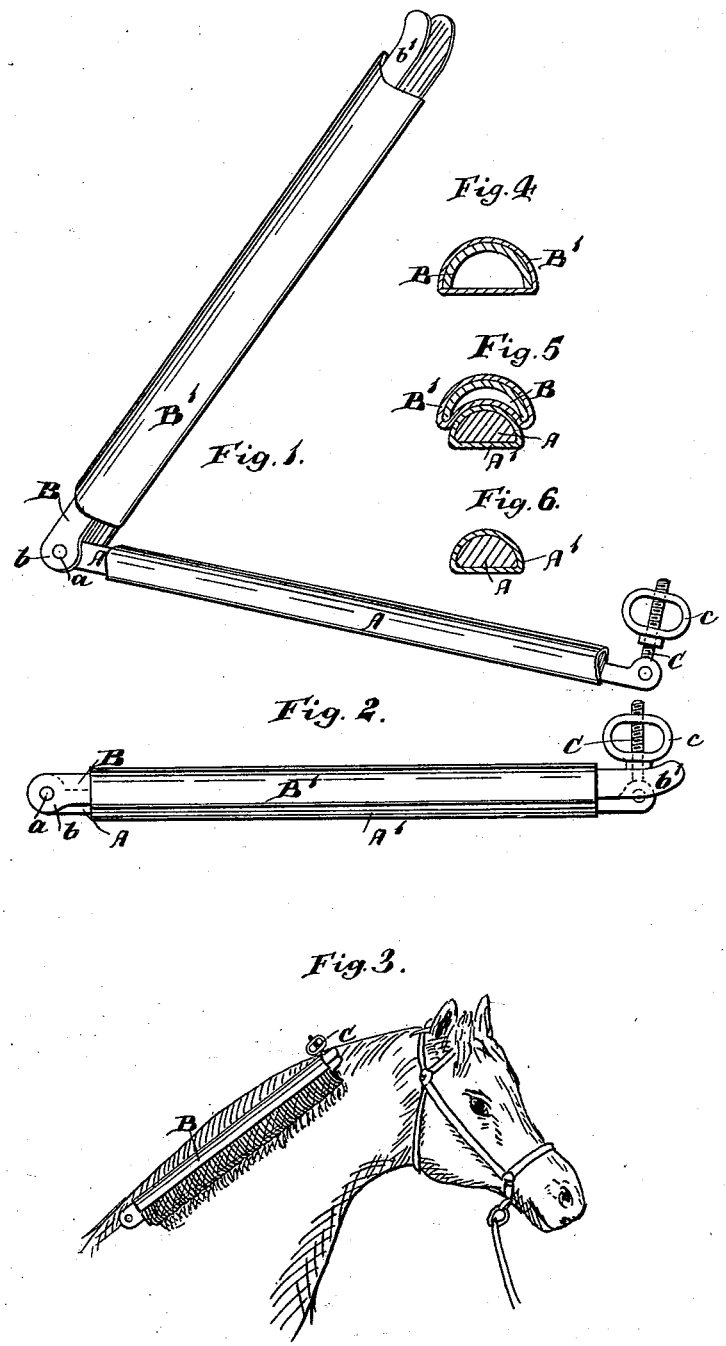
Witnesses
Walter Talbot Saywell
Henry Ernest Haggard
Inventor
Walter John Godden
per
Henry Nock
Attorney

United States Patent Office.

WALTER JOHN GODDEN, OF LONDON, ENGLAND.

DEVICE FOR TRAINING HORSES' MANES.

SPECIFICATION forming part of Letters Patent No. 549,781, dated November 12, 1895.

Application filed January 2, 1894. Serial No. 495,459. (No model.) Patented in England August 23, 1893, No. 15,942.

*To all whom it may concern:*

Be it known that I, WALTER JOHN GODDEN, coachman, a subject of the Queen of Great Britain and Ireland, residing at 10 Clifton Terrace, Brighton, England, have invented a certain new and Improved Device for Training the Manes of Horses, (for which I have obtained Letters Patent of Great Britain, No. 15,942, dated August 23, 1893,) of which the following is a specification.

My invention relates to improvements in devices for training and curling the manes of horses; and it consists of the novel devices hereinafter described and claimed.

Reference is had to the accompanying drawings, wherein the same parts are indicated by the same letters throughout the several views.

Figure 1 is a perspective view of my device, showing the bars open. Fig. 2 is a side elevation of the same closed. Fig. 3 shows my device as applied to the mane of a horse. Fig. 4 is a cross-section through the upper bar B and its elastic covering B'. Fig. 5 is a similar view through the two bars when closed; and Fig. 6 is a similar view to Fig. 4, showing a cross-section through the lower bar A and its covering A'.

My device consists, essentially, of two bars A and B, hinged together by means of a pin *a* passing through a hole in one end of the bar A and through a pair of holes in the end *b* of the bar B and adapted to be clamped at their free ends by suitable means when the said free ends are brought together. The bar A is made solid and of a semicylindrical form in cross-section and is covered with a casing A', of elastic fabric or rubber, as shown in Fig. 6. The bar B is made in the form of a hollow semicylinder in cross-section and is covered with a casing B', of elastic fabric or rubber, as shown in Fig. 4.

When in use, the bar A, provided with its elastic covering A', fits up into the hollow side of the bar B and presses the elastic covering B' thereon upward into the hollow thereof, making a firm hold for the device upon the horse's mane. This is illustrated most clearly in Fig. 5, which shows a cross-section through the device when the arms are closed.

The bar A is made flat on its under side in order that the device may lie more smoothly upon the horse's neck when in use.

The free ends of the two bars are clamped together when in use by means of the screw C, which is pivoted in the free end of the bar A, as shown, and has a thumb-nut *c*, adapted to screw thereon. The free end of the bar B is bifurcated, as at *b'*, to allow the screw C to swing into said bifurcation when the bars are closed, and the device may be then clamped firmly by screwing up on the thumb-nut *c*.

Having thus described my invention, what I claim, and desire to secure by Letters Patent of the United States, is—

A device for training a horse's mane, consisting of a solid semicylindrical bar and a hollow semicylindrical bar, each covered with a casing of elastic material, pivoted together at one end so that the convex side of the solid bar will fit into the concave side of the hollow bar, when the free ends of said bars are brought together, and a device for clamping the free ends of the two bars together, substantially as described.

WALTER JOHN GODDEN.

Witnesses:
 PERCY A. SMITH,
 ST. AULEY CARD.